United States Patent
Park

(10) Patent No.: US 9,091,816 B2
(45) Date of Patent: Jul. 28, 2015

(54) METHOD OF FABRICATING PATTERNED RETARDER

(75) Inventor: Su-Hyun Park, Seoul (KR)

(73) Assignee: LG DISPLAY CO., LTD., Seoul (KR)

(*) Notice: Subject to any disclaimer, the term of this patent is extended or adjusted under 35 U.S.C. 154(b) by 801 days.

(21) Appl. No.: 13/312,544

(22) Filed: Dec. 6, 2011

(65) Prior Publication Data

US 2012/0141689 A1  Jun. 7, 2012

(30) Foreign Application Priority Data

Dec. 7, 2010  (KR) .................. 10-2010-0124487
Nov. 23, 2011  (KR) .................. 10-2011-0123007

(51) Int. Cl.
| | | |
|---|---|---|
| B05D 3/00 | (2006.01) | |
| C08J 7/18 | (2006.01) | |
| G21H 5/00 | (2006.01) | |
| G02B 5/30 | (2006.01) | |
| G02B 5/32 | (2006.01) | |

(52) U.S. Cl.
CPC ............. *G02B 5/3083* (2013.01); *G02B 5/32* (2013.01)

(58) Field of Classification Search
CPC ...... G02B 5/3083; G02B 5/32; G02B 5/3016; G02B 27/26
USPC .............. 427/508, 162, 163.1, 542, 541, 553, 427/558, 595
See application file for complete search history.

(56) References Cited

U.S. PATENT DOCUMENTS

| | | | | |
|---|---|---|---|---|
| 6,046,787 | A * | 4/2000 | Nishiguchi | 349/129 |
| 6,743,487 | B2 * | 6/2004 | Sakai et al. | 428/1.2 |
| 6,894,751 | B2 * | 5/2005 | Payne et al. | 349/117 |
| 2004/0241319 | A1 * | 12/2004 | Sa et al. | 427/162 |
| 2006/0257078 | A1 * | 11/2006 | Kawahara et al. | 385/81 |
| 2010/0068419 | A1 * | 3/2010 | Kim et al. | 428/1.23 |
| 2010/0073604 | A1 * | 3/2010 | Okuyama et al. | 349/75 |

FOREIGN PATENT DOCUMENTS

| JP | 2009-223190 A | 10/2009 |
|---|---|---|
| WO | WO 2005012990 A1 * | 2/2005 |

* cited by examiner

*Primary Examiner* — Michael Wieczorek
(74) *Attorney, Agent, or Firm* — Birch, Stewart, Kolasch & Birch, LLP

(57) ABSTRACT

A method of fabricating a patterned retarder includes: forming a retarder material layer on a substrate by coating a retarder material; irradiating a first polarized UV ray onto the retarder material layer, the first polarized UV ray having a first polarization axis; irradiating a second polarized UV ray onto the retarder material layer, the second polarized UV ray having a second polarization axis perpendicular to the first polarization axis; and baking the retarder material layer to form first and second oriented patterns alternating with each other, each of the first and second oriented patterns having an anisotropic property.

19 Claims, 14 Drawing Sheets

CnMeO(n=6 and 8)

n=2:P2CB
n=6:P6CB

METHOD OF FABRICATING PATTERNED RETARDER

The present application claims the benefit of Korean Patent Application No. 10-2010-0124487 filed in Republic of Korea on Dec. 7, 2010 and No. 10-2011-0123007 filed in Republic of Korea on Nov. 23, 2011, which are hereby incorporated by reference in their entirety.

BACKGROUND

1. Field of the Disclosure

The present disclosure relates to a patterned retarder for a three-dimensional image display device, and more particularly, to a method of fabricating a patterned retarder where fabrication process is simplified.

2. Discussion of the Related Art

Recently, according to a user's request for a display device displaying a three-dimensional image having an actual feeling, three-dimensional display devices have been researched and developed. In general, a stereoscopic image expressing a three-dimension is displayed using a principle of stereovision through eyes. Accordingly, a three-dimensional image display devices that display an image of a stereoscopic effect using a binocular disparity due to a separation distance of eyes, e.g., about 65 mm have been suggested.

In general, a three-dimensional image display device includes a display panel displaying an image, a patterned retarder attached to outer surface of the display panel and a pair of glasses selectively transmitting the image passing through the patterned retarder. For example, a liquid crystal panel may be used as the display panel. The patterned retarder polarizes two-dimensional images from the liquid crystal panel differently. For example, a right-eye image and a left-eye image of the two-dimensional images may be polarized to have a right circularly polarization state and a left circularly polarization state, respectively.

The patterned retarder may be fabricated through a complex process. FIG. 1A to 1D are cross-sectional views showing a method of fabricating a patterned retarder according to the related art. In FIG. 1A, a light orientation film 20 having a plurality of disordered polymer side chains is formed on a substrate 10 by coating and curing a polymeric material using a coating apparatus 90. For example, the polymeric material may have a property such that polymer side chains are aligned along one direction in response to an ultraviolet (UV) ray.

In FIG. 1B, the substrate 10 having the light orientation film 20 is disposed in a heat treating apparatus 95 and a dry process where the substrate 10 is heated for several seconds to several minutes is preformed so that a solvent in the light orientation film 20 can be removed.

In FIG. 1C, a first photo mask 70 having a transmissive area TA and a blocking area BA is disposed over the light orientation film 20 and a first polarized UV ray is irradiated onto the light orientation film 20 through the transmissive area TA of the first photo mask 70. As a result, the first polarized UV ray is selectively irradiated onto the light orientation film 20 to form a first oriented region 21 having a first orientation state along a first direction. For example, the first polarized UV ray may be irradiated onto a region corresponding to one of a right-eye image column and a left-eye image column so that the polymer side chains of the region are aligned along the first direction, while the other region where the first polarized UV ray is not irradiated has polymer side chains randomly aligned. Accordingly, the light orientation film 20 has the first oriented region 21 where the polymer chains are aligned along the first direction and a non-oriented region where the polymer chains are randomly aligned by irradiation of the first polarized UV ray.

In FIG. 1D, a second photo mask 72 having a transmissive area TA and a blocking area BA is disposed over the light orientation film 20 and a second polarized UV ray is irradiated onto the light orientation film 20 through the transmissive area TA of the second photo mask 72. The transmissive area TA and the blocking area BA of the second photo mask 72 correspond to the non-oriented region and the first oriented region 21, respectively, of the light orientation film 20. As a result, the second polarized UV ray is selectively irradiated onto the light orientation film 20 to form a second oriented region 23 having a second orientation state along a second direction perpendicular to the first direction. For example, the second polarized UV ray may be irradiated onto a region corresponding to the other one of the right-eye image column and the left-eye image column so that the polymer side chains of the region are aligned along the second direction.

Although not shown, a liquid crystal layer is formed on the orientation film 20 having the first and second oriented regions 21 and 23 and the liquid crystal layer is cured with a UV ray and a heat to form a patterned retarder.

However, since the patterned retarder is fabricated through a coating step for the orientation film 20, a dry step for the orientation film 20, two irradiation steps for the first and second oriented regions 21 and 23, a coating step for the liquid crystal layer and a UV curing step and a baking step for the liquid crystal layer, the fabrication process of the patterned retarder is complicated and the complicated fabrication process causes increase in fabrication cost.

SUMMARY

Accordingly, the present disclosure is directed to a method of fabricating a patterned retarder that substantially obviates one or more of the problems due to limitations and disadvantages of the related art.

An object of the present disclosure is to provide a method of fabricating a patterned retarder where a fabrication process is simplified and a fabrication cost is reduced.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a method of fabricating a patterned retarder includes: forming a retarder material layer on a substrate by coating a retarder material; irradiating a first polarized UV ray onto the retarder material layer, the first polarized UV ray having a first polarization axis; irradiating a second polarized UV ray onto the retarder material layer, the second polarized UV ray having a second polarization axis perpendicular to the first polarization axis; and baking the retarder material layer to form first and second oriented patterns alternating with each other, each of the first and second oriented patterns having an anisotropic property.

In another aspect, a method of fabricating a patterned retarder includes: forming a retarder material layer on a substrate by coating a retarder material; irradiating a first polarized UV ray onto the whole retarder material layer, the first polarized UV ray having a first polarization axis and a first energy density; irradiating a second polarized UV ray onto the retarder material layer, the second polarized UV ray having a second polarization axis perpendicular to the first polarization axis and a second energy density greater than the first energy density; and baking the retarder material layer to form first and second oriented patterns alternating with each other, each of the first and second oriented patterns having an anisotropic property.

In another aspect, a method of fabricating a patterned retarder includes: forming a retarder material layer on a substrate by coating a retarder material; irradiating a first polarized UV ray onto the retarder material layer, the first polarized UV ray having a first polarization axis and a first energy density; irradiating a second polarized UV ray onto the whole retarder material layer, the second polarized UV ray having a second polarization axis perpendicular to the first polarization axis and a second energy density smaller than the first energy density; and baking the retarder material layer to form first and second oriented patterns alternating with each other, each of the first and second oriented patterns having an anisotropic property.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

A three-dimensional image display device using a liquid crystal panel will be illustrated hereinafter. A liquid crystal panel includes first and second substrates having first and second electrodes, respectively, and a liquid crystal layer between the first and second substrates. Liquid crystal molecules in the liquid crystal layer are driven by an electric field generated between the first and second electrodes to display an image. Since the liquid crystal molecule has a polarization property, charges are accumulated at both sides of the liquid crystal molecule and arrangement direction of the liquid crystal molecule is changed by the electric field when the electric field is applied to the liquid crystal molecule. In addition, since the liquid crystal molecule has a long and thin profile, the liquid crystal molecule has an optical anisotropy such that a path or a polarization state of an emitted light is changed according to a direction or a polarization state of an incident light. Accordingly, the liquid crystal layer has a transmittance difference by a voltage applied to the first and second electrodes, and a two-dimensional image is displayed by the pixels having various transmittances.

A three-dimensional image display device using a liquid crystal panel may have one of a volumetric type, a holographic type and a stereoscopic type. The stereoscopic type three-dimensional image display device may be classified into a glasses type and a glasses-free type. In addition, the glasses type three-dimensional image display device may be divided into a polarization glasses type using difference in polarization direction, a time division type using shutter glasses and a concentration difference type using images of different brightness.

Figure 1A:
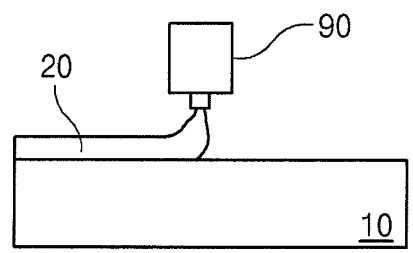
FIG. 1A to 1D are cross-sectional views showing a method of fabricating a patterned retarder according to the related.
Figure 1B:
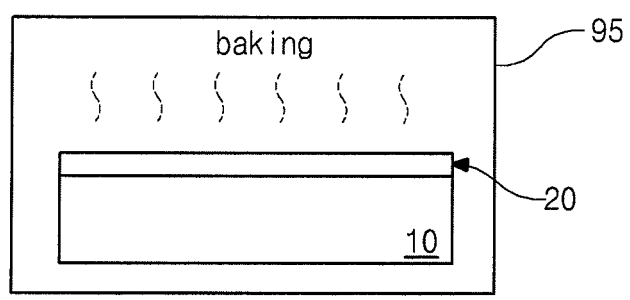
Figure 1C:
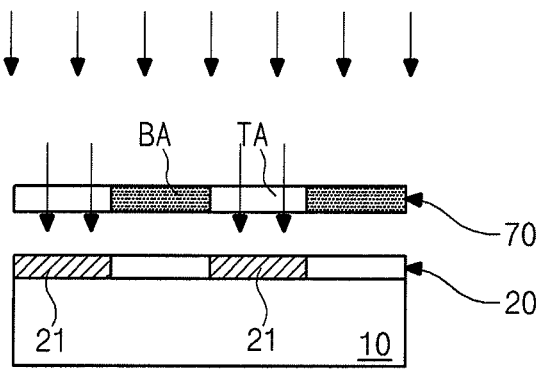
Figure 1D:
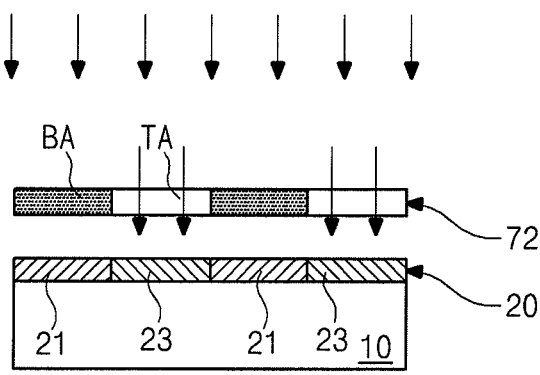
Figure 2:
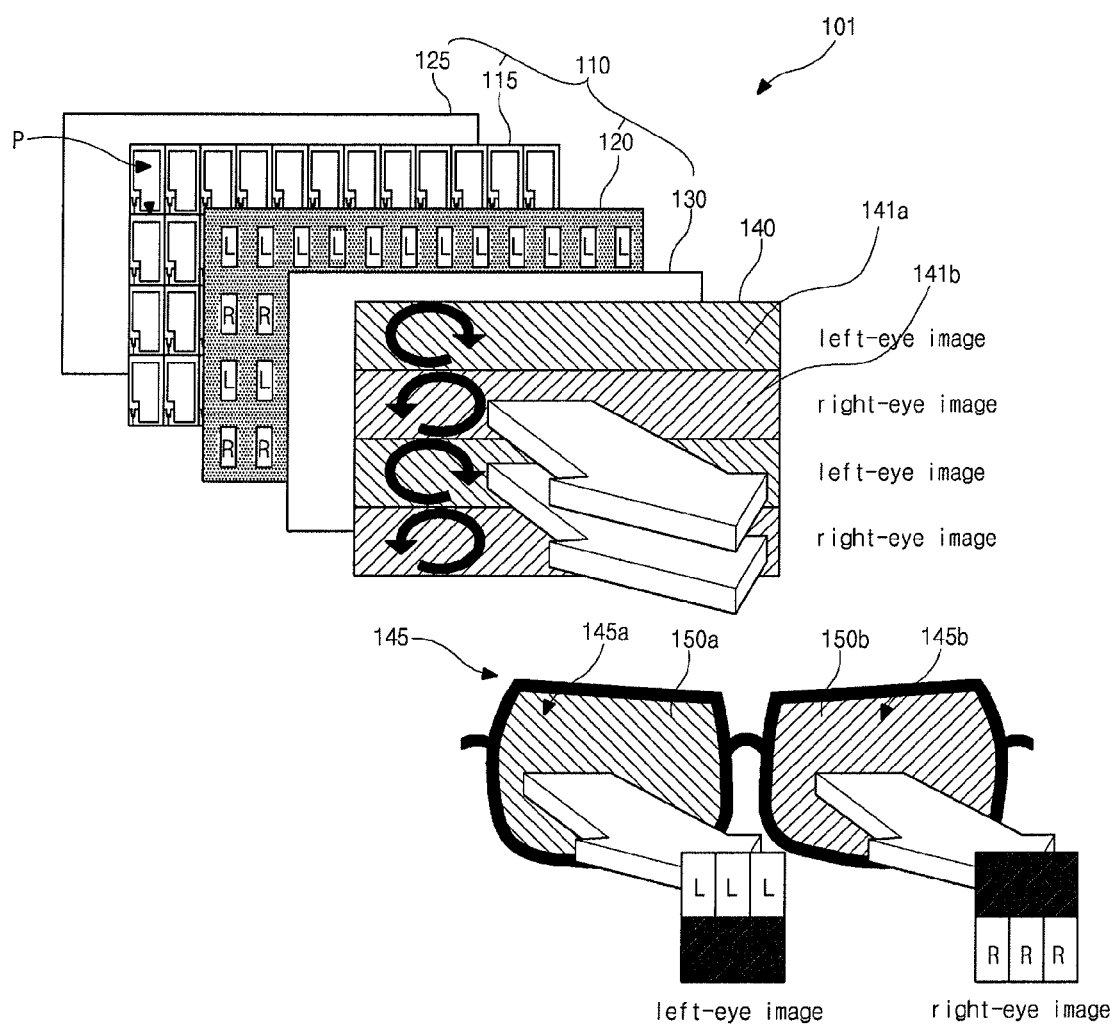
FIG. 2 is an exploded perspective view showing a glasses type three-dimensional image display device including a patterned retarder according to an embodiment of the present invention.

FIG. 2 is an exploded perspective view showing a glasses type three-dimensional image display device including a patterned retarder according to an embodiment of the present invention.

In FIG. 2, a glasses type three-dimensional image display device 101 includes a liquid crystal panel 110, a patterned retarder 140 on an outer surface of the liquid crystal panel 110 and a pair of glasses 145 selectively transmitting images from the liquid crystal panel 110 through the patterned retarder 140. The liquid crystal panel 110 includes first and second substrates 115 and 120, a liquid crystal layer (not shown), first and second polarizing plates 125 and 130 and a backlight unit (not shown). The first and second substrates 115 and 120 face into and are spaced apart from each other, and the liquid crystal layer is formed between the first and second substrates 115 and 120. The first and second polarizing plates 125 and 130 are formed on outer surfaces of the first and second substrates 115 and 120, respectively. A transmission axis of the first polarizing plate 125 may be perpendicular to a transmission axis of the second polarizing plate 130. In addition, the backlight unit is disposed on an outer surface of the first polarizing plate 125.

The patterned retarder 140 may be formed of a birefractive material and may have first and second regions 141a and 141b alternating each other. The first and second regions 141a and 141b may correspond to odd and even pixel rows, respectively, of the liquid crystal panel 110 and may change polarization states of light passing through the second polarizing plate 130. For example, the first region 141a may change the linearly polarized light passing through the second polarizing plate 130 into a right-handed circularly polarized light and the second region 141b may change the linearly polarized light passing through the second polarizing plate 130 into a left-handed circularly polarized light. The patterned retarder 140 may have a phase difference of λ/4 (quarter wave). In addition, an optical axis of the patterned retarder 140 may have one of about +45° and about −45° with respect to a transmission axis of the second polarizing plate 130.

Accordingly, the pixels in the odd pixel rows of the liquid crystal panel 110 display a left-eye image and the pixels in the even pixel rows of the liquid crystal panel 110 display a right-eye image. In addition, the left-handed circularly polarized light of the left-eye image is emitted from the first region 141a corresponding to the odd pixel rows and the right-handed circularly polarized light of the right-eye image is emitted from the second region 141b corresponding to the even pixel rows.

The pair of glasses 145 includes lenses 145a and 145b of a transparent glass, polarizing films 150a and 150b and retardation films having a phase difference of λ/4 (quarter wave). For example, a left-eye retardation film of λ/4 (not shown) and a left-eye polarizing film 150a may be sequentially formed on an inner surface of a left-eye lens 145a and a right-eye retardation film of λ/4 (not shown) and a right-eye polarizing film 150b may be sequentially formed on an inner surface of a right-eye lens 145b. Each of the retardation films of λ/4 changes the circularly polarized light into a linearly polarized light and each of the polarizing films 150a and 150b filters the linearly polarized light according to a polarization axis.

As a result, when a user wearing the pair of glasses 145 watches the images displayed by the liquid crystal panel 110 through the patterned retarder 140, the left-eye image and the right-eye image selectively pass through the left-eye lens 145a and the right-eye lens 145b, respectively, and the user recognizes a three-dimensional image by combining the left-eye image and the right-eye image.

The patterned retarder 140 is one of the most important elements for the glasses type three-dimensional image display device 101 and a fabrication method of the patterned retarder 140 will be illustrated hereinafter.

FIGS. 3A to 3D are cross-sectional views showing a method of fabricating a patterned retarder of a glasses type three-dimensional image display device according to a first embodiment of the present invention.

Figure 3A:
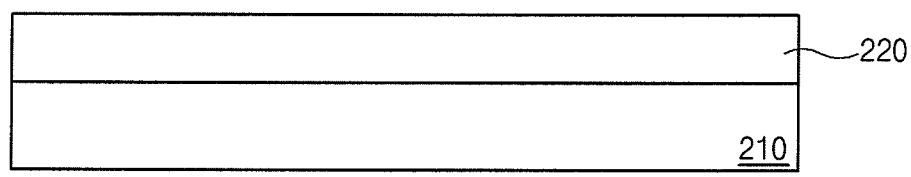
FIGS. 3A to 3D are cross-sectional views showing a method of fabricating a patterned retarder of a glasses type three-dimensional image display device according to a first embodiment of the present invention.

In FIG. 3A, a retarder material layer 220 is formed on a transparent substrate 210 by coating the substrate 210 with a solution of a retarder material. The retarder material layer 220 may have a thickness of about 0.5 μm to about 2.0 μm. For example, the substrate 210 may be one of a glass substrate, a film and a flexible substrate. The film may include one of tri acetate cellulose (TAC), cyclo olephine polymer (COP), poly carbonate (PC), polymethyl methacrylate (PMMA), polyethylene terephthalate (PET), polyethylene naphthalate (PEN), polyethersulfone (PES), polystyrene (PS) and polyimide (PI). In addition, the retarder material may include a photo-reactive liquid crystalline polymer, and the solution of the retarder material may be coated using one of a spin coating apparatus and a slit coating apparatus.

Figure 4:
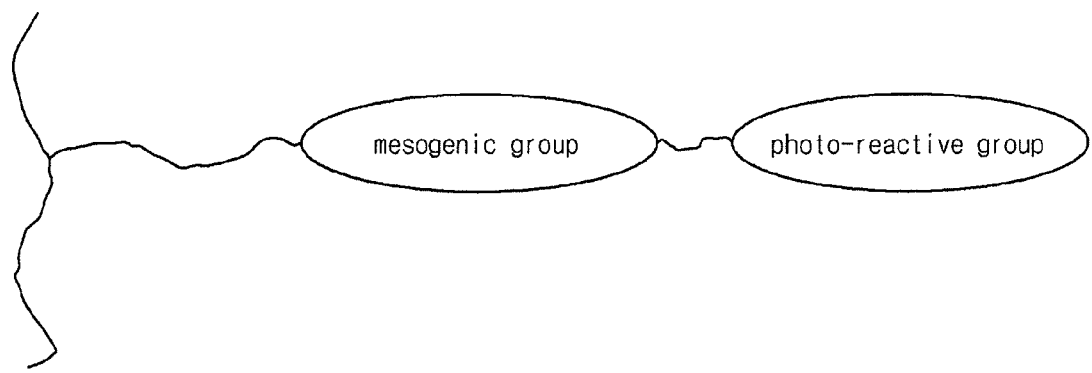
FIG. 4 is a view showing a molecular structure of a retarder material for a patterned retarder of a glasses type three-dimensional image display device according to a first embodiment of the present invention.
Figure 5:
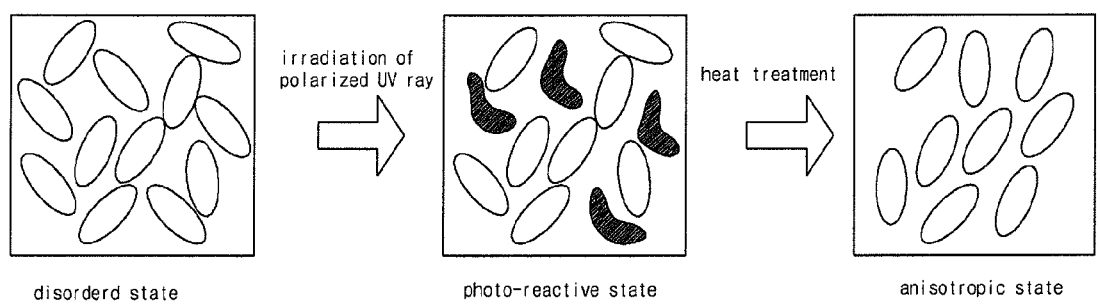
FIG. 5 is a view showing a change in a molecular state of a retarder material for a patterned retarder of a glasses type three-dimensional image display device according to a first embodiment of the present invention.

FIG. 4 is a view showing a molecular structure of a retarder material for a patterned retarder of a glasses type three-dimensional image display device according to a first embodiment of the present invention, and FIG. 5 is a view showing a change in a molecular state of a retarder material for a patterned retarder of a glasses type three-dimensional image display device according to a first embodiment of the present invention.

In FIGS. 4 and 5, the retarder material for the retarder material layer 220 (of FIG. 3A) may include a photo-reactive liquid crystalline polymer and may transition from a disordered state to an anisotropic state through a photo-reaction state an irradiation of a polarized UV ray and a heat treatment. As a result, the retarder material has an anisotropic property by an axis-selective photochemistry due to the irradiation of the polarized UV ray and by a self-orientation due to the heat treatment. For example, the retarder material may have a main chain including polymethacrylate and a side chain including a photo-reactive group and a mesogenic group together. Alternatively, the retarder material may have a main chain including polymethacrylate and a side chain of a copolymer including the photo-reactive group and the mesogenic group. One of a photo-isomerization and a photo-dimerization may be used as a trigger for the anisotropic property and the side chain may include one of azobenzene, cinnamate, coumarin and benzylidenephthalimidine. In addition, the retarder material may have a refractive index anisotropy (Δn) of about 0.10 to about 0.18.

The anisotropic property of the retarder material is obtained by the axis-selective reaction of the photo-reactive group due to the polarized UV ray and by the self-orientation reaction of the mesogenic group due to the heat. For example, the retarder material may have a homopolymer type where the photo-reactive mesogenic group is included in the side chain. The photo-reactive group and the mesogenic group of the photo-reactive mesogenic group may be connected to each other by a carbon chain. Alternatively, the photo-reactive group itself may be the mesogenic group, or the photo-reactive groups connected to each other by a hydrogen bonding may constitute the mesogenic group.

In addition, the retarder material may have a copolymer type where the photo-reactive group is included in the side chain and an additional mesogenic group is included in the side chain. Alternatively, the retarder material may have a blending polymer type where a photo-reactive mesogenic group is mixed with a host polymer.

Figure 6A:
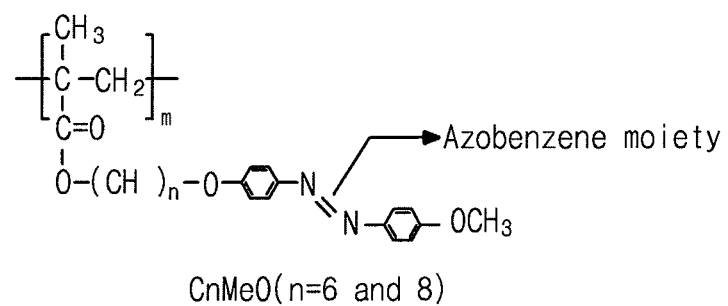
FIGS. 6A to 6G are views showing molecular structures of a retarder material for a patterned retarder of a glasses type three-dimensional image display device according to a first embodiment of the present invention.
Figure 6B:
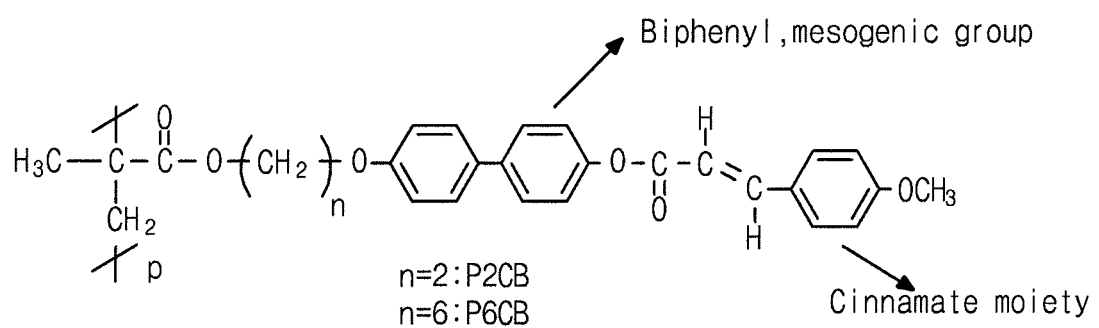
Figure 6C:
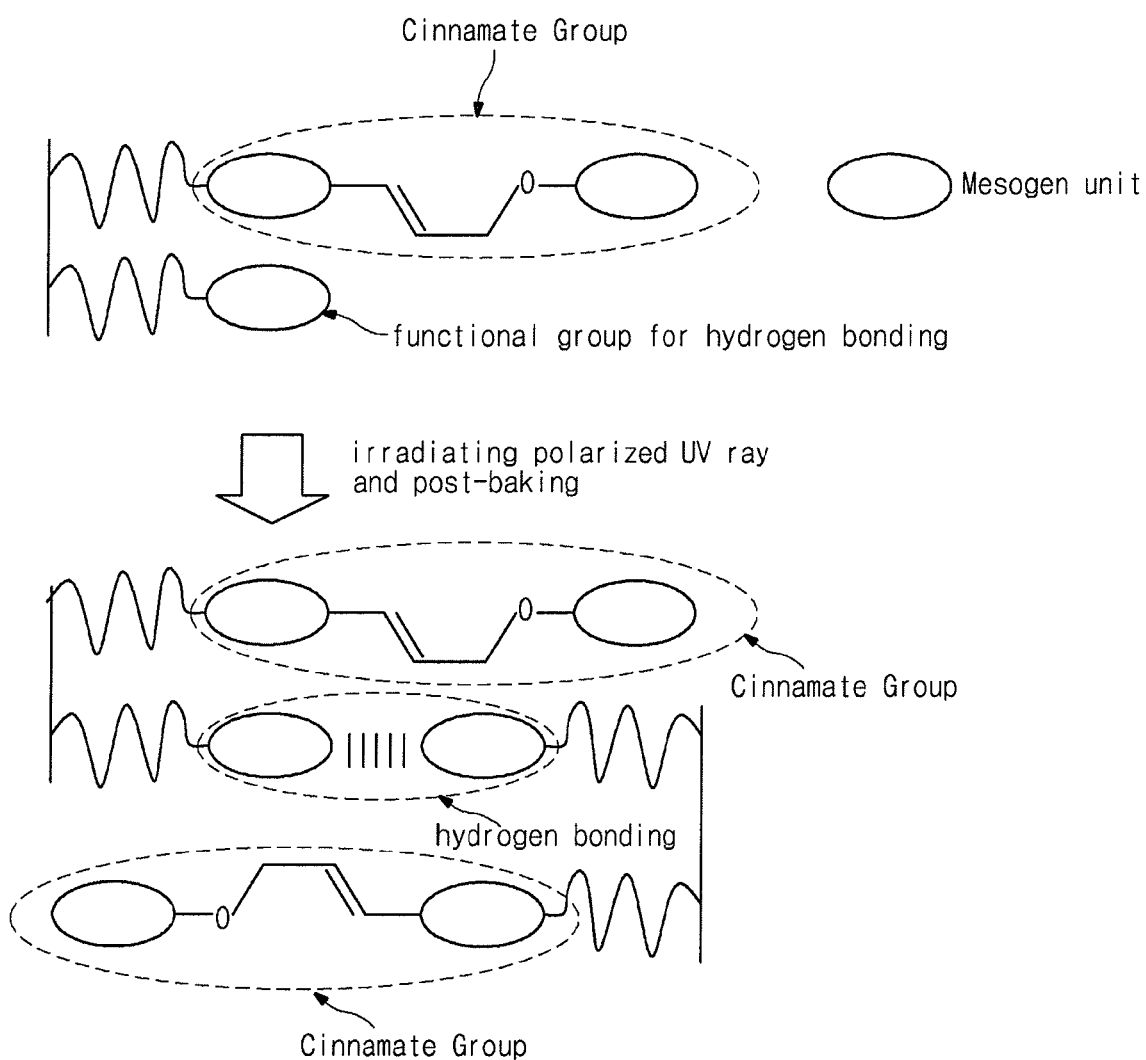
Figure 6D:
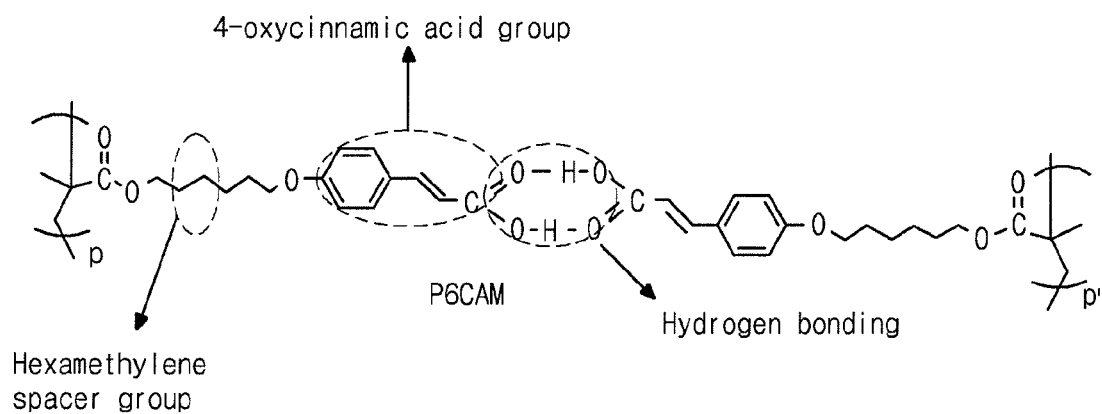
Figure 6E:
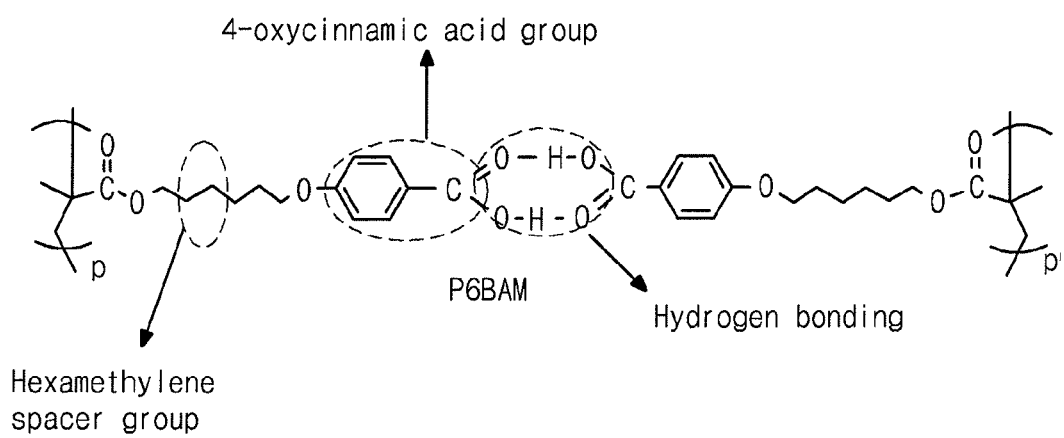
Figure 6F:
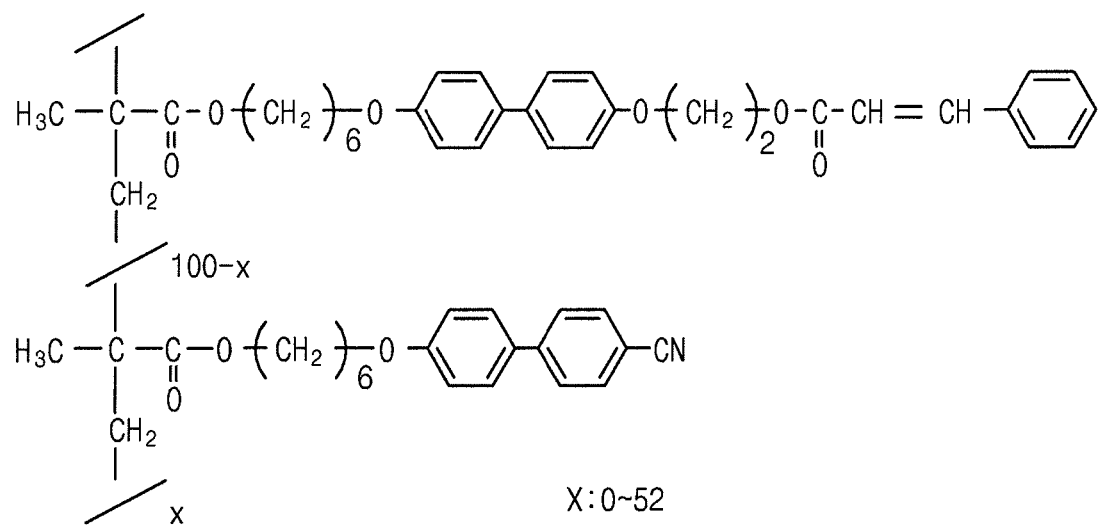
Figure 6G:
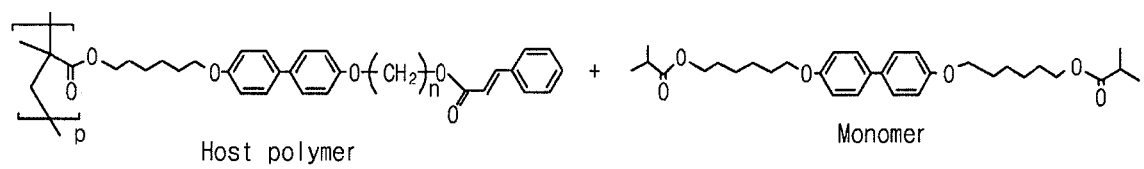

FIGS. 6A to 6G are views showing molecular structures of a retarder material for a patterned retarder of a glasses type three-dimensional image display device according to a first embodiment of the present invention. FIGS. 6A to 6E show a retarder material of a homopolymer, and FIG. 6F shows a retarder material of a copolymer. In addition, FIG. 6G shows a retarder material where a reactive mesogenic group is mixed with a host polymer.

In FIG. 6A, a retarder material may have a homopolymer type where a photo-reactive mesogenic polymer includes an azobenzene group. The photo-reactive mesogenic polymer includes a polymethacrylate group in a main chain and the azobenzene group in a side chain. The azobenzene has a mesogenic property.

In FIGS. 6B to 6F, a retarder material may have a photo-reactive mesogenic polymer including a cinnamate group. The photo-reactive mesogenic polymer including a cinnamate group may be classified into three types. As shown in FIG. 6B, the photo-reactive mesogenic polymer may have a homopolymer type where a cinnamate group and a mesogenic group are included in a side chain. As shown in FIGS. 6C to 6E, the photo-reactive mesogenic polymer may have a homopolymer type where a cinnamate group is included in a side chain and a mesogenic property is obtained by a hydrogen bonding between the adjacent side chains. In addition, as shown in FIG. 6F, the photo-reactive mesogenic polymer may have a copolymer (or a hetero-polymer) where a cinnamate group and a mesogenic group are included in a side chain and an additional mesogenic group is included in another side chain.

In FIG. 6B, a retarder material may have a homopolymer type where a biphenyl group as a mesogenic group is bonded to a main chain by a spacer (e.g., a carbon chain) and a cinnamate group is bonded to the biphenyl group. An additional spacer may be added between the biphenyl group and the cinnamate group and a methoxy group may be bonded to the cinnamate group. A detailed change in a molecular structure may influence a solubility to a specific solvent, a photo-reactivity relating to an efficiency of photo-reaction and an in-plane order.

In FIG. 6C, a retarder material may have a homopolymer type where a cinnamate group is included in a side chain and a mesogenic property is obtained by a hydrogen bonding between the adjacent side chains. For example, a mesogenic polymer may be formed by a hydrogen bonding of a terminal group of the side chain. Since the hydrogen bonding functions for an anisotropic property, the polymer may have a mesogenic property by the hydrogen bonding without a biphenyl group.

When a polarized UV ray having a relatively low energy is irradiated onto the retarder material of FIG. 6C, an isomerization is dominant. In addition, a polarized UV ray having a relatively high energy is irradiated onto the retarder material of FIG. 6C, a dimerization is dominant. After the polarized UV ray is irradiated, the retarder material is baked up to a nematic to isotropic transition temperature Tni and anisotropic formation is maximized by an orientational amplification. In addition, the anisotropic property is further obtained by the hydrogen bonding between molecules.

FIGS. 6D and 6E show exemplary retarder materials where the an isotropic property is obtained by the hydrogen bonding, In FIG. 6F, a retarder material may have a copolymer type where a cinnamate group and a mesogenic group are included in a side chain and an additional mesogenic group is included in another side chain. Alternatively, a photo-reactive group and a mesogenic group may constitute a copolymer type.

In FIG. 6G, a retarder material may have a blending type where a photo-reactive mesogenic group of a monomer is mixed with a host polymer. The photo-reactive mesogenic group may reduce a nematic to isotropic transition temperature Tni of the host polymer to aid in anisotropic formation. Alternatively, a photo-reactive mesogenic group may be formed as a polymer and the retarder material may have a blending polymer type where a photo-reactive mesogenic group of a polymer is mixed with a host polymer.

The retarder material may have a retardation value ($\Delta$nd) of about 125 nm±10 nm with respect to a reference wavelength of about 550 nm. In addition, a retarder material solution where the retarder material melts in a solvent may have a viscosity of about 1 mPas to about 50 mPas and a concentration of the retarder material to the solution may be within a range of about 1 wt % to about 30 wt %. The solvent may include at least one of a ketone group, an ether group and a toluene group. For example, the ketone group may include cyclohexanone, cyclopentanone, cyclopetanone and methyl isobutyl ketone (MIBK), and the ether group may include propylene glycol monomethyl ether (PGME). For the purpose of improving a coating property of the solution, a leveling agent including a silicon group or an acryl group may be added to the solvent.

Referring again to FIG. 3A, after the retarder material layer 220 is formed on the substrate 210, the substrate 210 is transferred to a drying apparatus such as an oven, a hot chamber and a hot plate and is heated in a temperature of about 24° C. to about 80° C. for about 60 sec to about 300 sec. As a result, the solvent in the retarder material layer 220 is partially eliminated and the retarder material layer 220 is dried. The step of drying the retarder material layer 220 may be referred to as a pre-baking process.

Figure 3B:
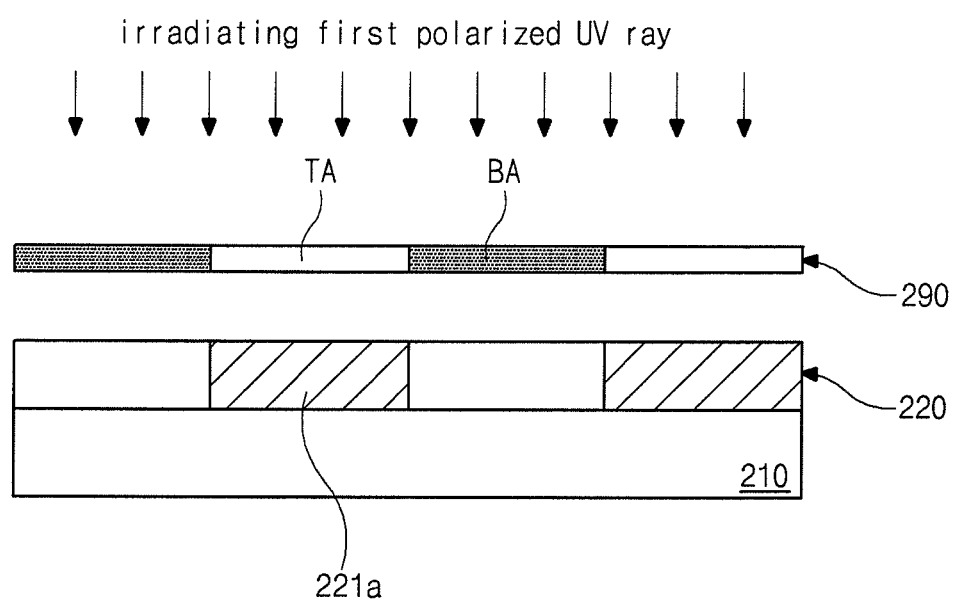

In FIG. 3B, a first photo mask 290 having a transmissive area TA and a blocking area BA is disposed over the retarder material layer 220. The transmissive area TA and the blocking area BA may have a stripe shape and may alternate with each other. Next, a first polarized UV ray is irradiated onto the retarder material layer 220 through the transmissive area TA of the first photo mask 290 to form a first oriented region 221a corresponding to the transmissive area TA. The first polarized UV ray may have an energy density of about 1 mJ/cm$^2$ to about 500 mJ/cm$^2$ and may have a wavelength of about 200 nm to about 500 nm.

The energy density of the polarized UV ray is an important parameter that determines the retardation value of the retarder material layer 220. In a three-dimensional image display device, a patterned retarder may have a retardation value ($\Delta$nd) of about 125 nm±10 nm with respect to a reference wavelength of about 550 nm. For the purpose of obtaining a patterned retarder that has a retardation value ($\Delta$nd) of about 125 nm±10 nm with respect to a reference wavelength of about 550 nm, the polarized UV ray having an energy density of about 1 mJ/cm$^2$ to about 500 mJ/cm$^2$ and a wavelength of about 200 nm to about 500 nm is irradiated onto the retarder material layer 220.

For example, when polarized UV rays having energy densities of about 8 mJ/cm$^2$, 20 mJ/cm$^2$, 40 mJ/cm$^2$, 60 mJ/cm$^2$, 80 mJ/cm$^2$ and 100 mJ/cm$^2$ are irradiated onto a retarder material layer 220, the retarder material layer 220 has retardation values ($\Delta$nd) of about 18.3 nm, about 53.5 nm, about 71.8 nm, about 92.5 nm, about 101.5 nm and about 130.2 nm, respectively, with respect to a reference wavelength of about 550 nm. Accordingly, the retarder material layer 220 of one retarder material has a retardation value ($\Delta$nd) of about 125 nm±10 nm when a polarized UV ray having an energy density of about 100 mJ/cm$^2$. However, a retarder material layer of another retarder material may have a retardation value ($\Delta$nd) of about 125 nm±10 nm when a polarized UV ray having an energy density of about 1 mJ/cm$^2$.

The retardation value ($\Delta$nd) of the retarder material layer 220 may be changed according to a retardation value of the pair of glasses 145 (of FIG. 2). Since the pair of glasses 145 have a retardation value ($\Delta$nd) of about 125 nm±10 nm, the patterned retarder 140 (of FIG. 2) has a retardation value ($\Delta$nd) of about 125 nm±10 nm to prevent a cross-talk between the pair of glasses 145 and the patterned retarder 140. When difference between the retardation value of the pair of glasses 145 and the patterned retarder 140 is less than about 10% of the retardation value of each of the pair of glasses 145 and the patterned retarder 140, the cross-talk can be prevented. Accordingly, the retardation value of the patterned retarder 140 may be determined within about ±10% of the retardation value of the pair of glasses 145.

The patterned retarder 140 is used in various fields as well as in the three-dimensional image display device, and the patterned retarder 140 in the various fields may have various retardation values. As a result, the energy density of the polarized UV ray may be determined to be within a range of about 1 mJ/cm$^2$ to about 500 mJ/cm$^2$ according to the required retardation value.

Figure 3C:
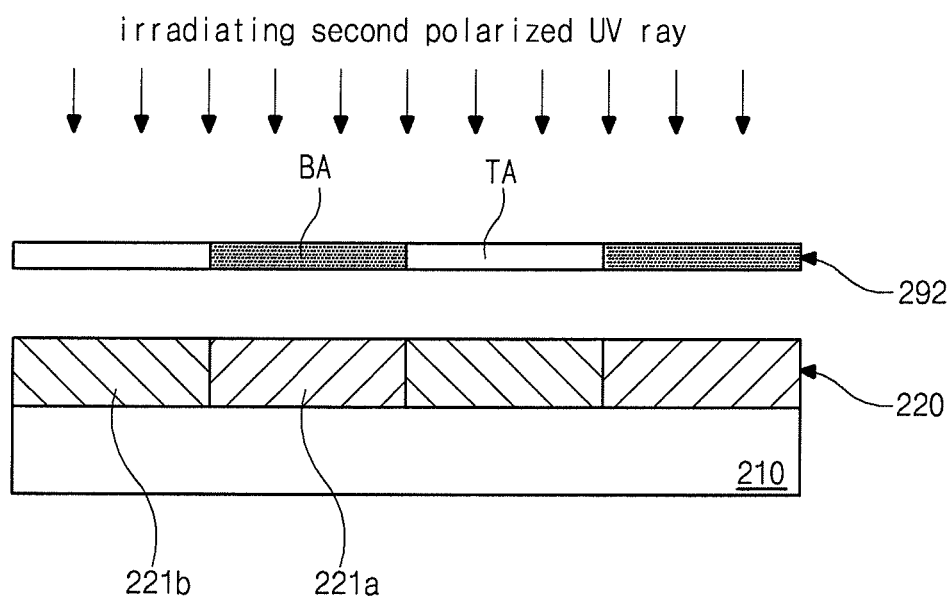

In FIG. 3C, after the first photo mask 290 (of FIG. 3B) is removed, a second photo mask 292 having a transmissive area TA and a blocking area BA is disposed over the retarder material layer 220 such that the blocking area BA corresponds to the first oriented region 221a. The transmissive area TA and the blocking area BA may have a stripe shape and may alternate with each other. Next, a first polarized UV ray is irradiated onto the retarder material layer 220 through the transmissive area TA of the second photo mask 292 to form a second oriented region 221b corresponding to the transmissive area TA. The first and second polarized UV rays have the same energy density and the same wavelength as each other. For example, the second polarized UV ray may have an energy density of about 1 mJ/cm$^2$ to about 500 mJ/cm$^2$ and may have a wavelength of about 200 nm to about 500 nm. In addition, the first and second polarized UV rays have different polarization axes from each other. For example, a polarization axis of the second polarized UV ray may be perpendicular to a polarization axis of the first polarized UV ray.

Figure 3D:
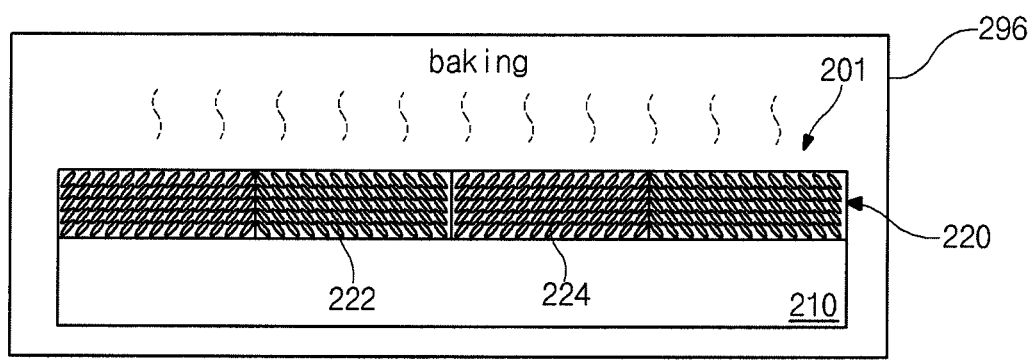

In FIG. 3D, the substrate 210 having the retarder material layer 220 is transferred to a baking apparatus such as an oven, a hot chamber and a hot plate and is heated in a temperature of about 80° C. to about 130° C. for about 30 sec to about 600 sec. As a result, the solvent in the retarder material layer 220 is completely eliminated and the retarder material layer 220 is baked. The step of baking the retarder material layer 220 may be referred to as a post-baking process.

The first and second oriented regions 221a and 221b of the retarder material layer 220 become first and second oriented patterns 222 and 224, respectively, by the post-baking process to complete a patterned retarder 201. The first and second oriented patterns 222 and 224 have anisotropic properties corresponding to the polarization axes of the first and second polarized UV rays. For example, the first oriented pattern 222 may have an anisotropic property along a direction perpendicular to the polarization axis of the first polarized UV ray, and the second oriented pattern 224 may have an anisotropic property along a direction perpendicular to the polarization axis of the second polarized UV ray. As a result, the retarder material layer 220 has an isotropic property before the first and second polarized UV rays are irradiated, and the first and second oriented patterns 222 and 224 of the retarder material layer 220 have anisotropic properties after the first and second polarized UV rays are irradiated and the retarder material layer 220 is baked. For example, the first oriented pattern 222 may convert a linearly polarized light into a left circularly polarized light and the second oriented pattern 224 may convert a linearly polarized light into a right circularly polarized light.

In the method of fabricating a patterned retarder of FIGS. 3A to 3D, the patterned retarder 201 is fabricated without using an orientation film. Since a coating step and a dry step for the orientation film and a UV curing step for the liquid crystal layer are omitted, the fabrication process of the patterned retarder 201 is simplified and the fabrication cost of the patterned retarder 201 is reduced.

Although not shown in FIGS. 3A to 3D, the patterned retarder 201 may be cut into a plurality of unit patterned retarder through a cutting step using a laser beam irradiation apparatus. In addition, an anti-reflection layer may be formed on each unit patterned retarder, or an anti-reflection film may be attached to each unit patterned retarder.

Although the patterned retarder 201 is fabricated using irradiation steps of the first and second UV rays through the first and second photo masks 290 and 292 in the first embodiment, a method of fabricating a patterned retarder may vary in another embodiment.

Figure 7A:
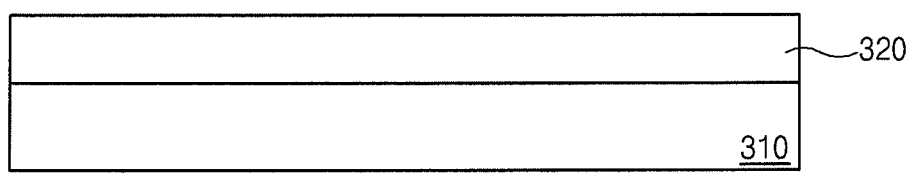
FIGS. 7A to 7C are cross-sectional views showing a method of fabricating a patterned retarder of a glasses type three-dimensional image display device according to a second embodiment of the present invention.
Figure 7B:
Figure 7B:
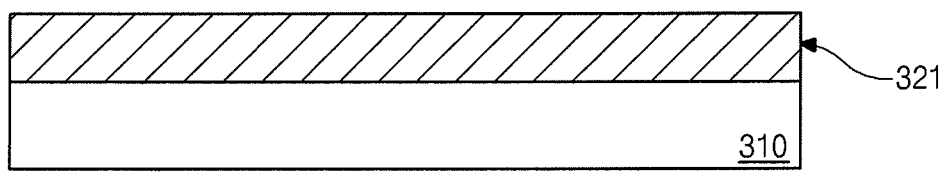
Figure 7C:
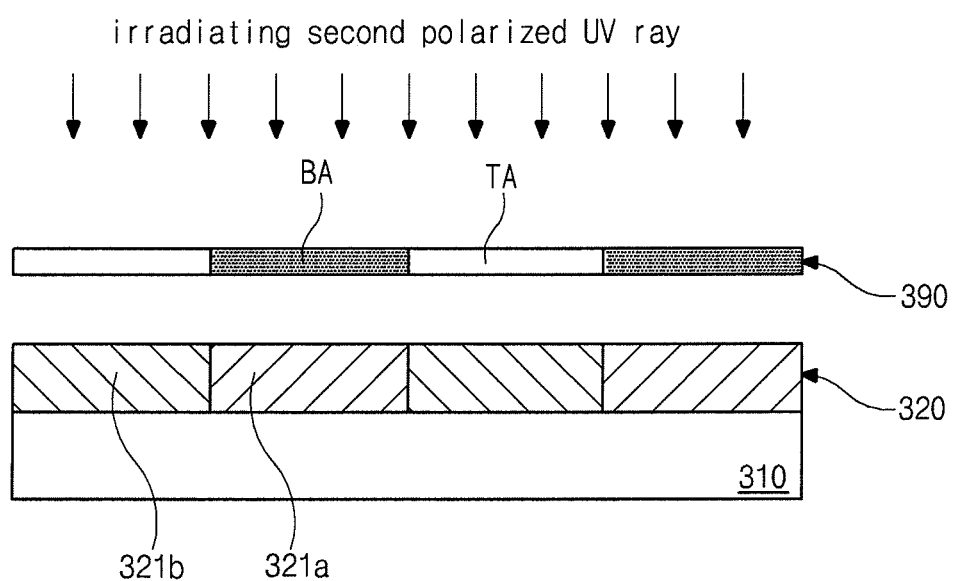

FIGS. 7A to 7C are cross-sectional views showing a method of fabricating a patterned retarder of a glasses type three-dimensional image display device according to a second embodiment of the present invention.

In FIG. 7A, a retarder material layer 320 is formed on a transparent substrate 310 by coating the substrate 310 with a solution of a retarder material. The retarder material layer 320 may have a thickness of about 0.5 μm to about 2.0 μm. For example, the substrate 310 may be one of a glass substrate, a film and a flexible substrate. The film may include one of tri acetate cellulose (TAC), cyclo olephine polymer (COP), poly carbonate (PC), polymethyl methacrylate (PMMA), polyethylene terephthalate (PET), polyethylene naphthalate (PEN), polyethersulfone (PES), polystyrene (PS) and polyimide (PI). In addition, the retarder material may include a photo-reactive liquid crystalline polymer, and the solution of the retarder material may be coated using one of a spin coating apparatus and a slit coating apparatus.

After the retarder material layer 320 is formed on the substrate 310, the substrate 310 is transferred to a drying apparatus such as an oven, a hot chamber and a hot plate and is heated in a temperature of about 24° C. to about 80° C. for about 60 sec to about 300 sec. As a result, the solvent in the retarder material layer 320 is partially eliminated and the retarder material layer 320 is dried. The step of drying the retarder material layer 320 may be referred to as a pre-baking process.

In FIG. 7B, a first polarized UV ray is irradiated onto the retarder material layer 320 without using a photo mask. The first polarized UV ray may have an energy density of about 1 mJ/cm$^2$ to about 500 mJ/cm$^2$ and may have a wavelength of about 200 nm to about 500 nm. As a result, a whole region of the retarder material layer 320 may become a first oriented layer 321 having a retardation value (Δnd) of about 125 nm±10 nm with respect to a reference wavelength of about 550 nm.

In FIG. 7C, a first photo mask 390 having a transmissive area TA and a blocking area BA is disposed over the retarder material layer 320. The transmissive area TA and the blocking area BA may have a stripe shape and may alternate with each other. Next, a second polarized UV ray is irradiated onto the retarder material layer 320 through the transmissive area TA of the first photo mask 390 to form first and second oriented regions 321a and 321b corresponding to the blocking area BA and the transmissive area TA, respectively. As a result, the first oriented region 321a is formed by irradiation of the first UV ray, and the second oriented region 321b is formed by irradiation of the first and second UV rays. Each of the first and second oriented regions 321a and 321b has a retardation value (Δnd) of about 125 nm±10 nm with respect to a reference wavelength of about 550 nm.

The first and second polarized UV rays have the same wavelength as each other. In addition, an energy density of the second polarized UV ray may be greater than an energy density of the first polarized UV ray. Preferably, an energy density of the second polarized UV ray may be greater than a double of an energy density of the first polarized UV ray. For example, the second polarized UV ray may have an energy density of about 2 mJ/cm$^2$ to about 1000 mJ/cm$^2$ and may have a wavelength of about 200 nm to about 500 nm. When the first polarized UV ray has an energy density of about 100 mJ/cm$^2$, the second polarized UV ray may have an energy density greater than about 200 mJ/cm$^2$.

Further, the first and second polarized UV rays have different polarization axes from each other. For example, a polarization axis of the second polarized UV ray may be perpendicular to a polarization axis of the first polarized UV ray.

The substrate 310 having the retarder material layer 320 is transferred to a baking apparatus such as an oven, a hot chamber and a hot plate and is heated in a temperature of about 80° C. to about 130° C. for about 30 sec to about 600 sec. As a result, the solvent in the retarder material layer 320 is completely eliminated and the retarder material layer 320 is baked. The step of baking the retarder material layer 320 may be referred to as a post-baking process. The first and second oriented regions 321a and 321b of the retarder material layer 320 become first and second oriented patterns, respectively, by the post-baking process to complete a patterned retarder.

In the method of fabricating a patterned retarder of FIGS. 7A to 7C, the patterned retarder is fabricated without using an orientation film. Since a coating step and a dry step for the orientation film and a UV curing step for the liquid crystal layer are omitted, the fabrication process of the patterned retarder is simplified and the fabrication cost of the patterned retarder is reduced.

Figure 8A:
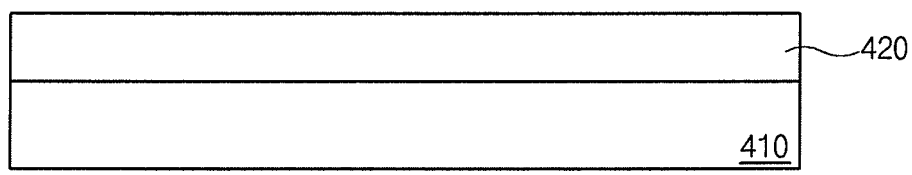
FIGS. 8A to 8C are cross-sectional views showing a method of fabricating a patterned retarder of a glasses type three-dimensional image display device according to a third embodiment of the present invention.
Figure 8B:
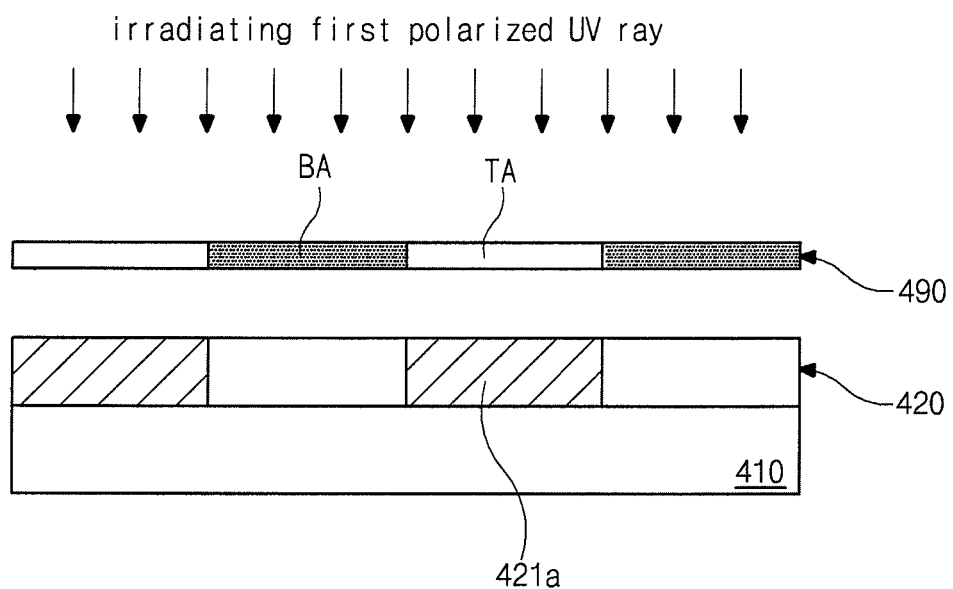
Figure 8C:
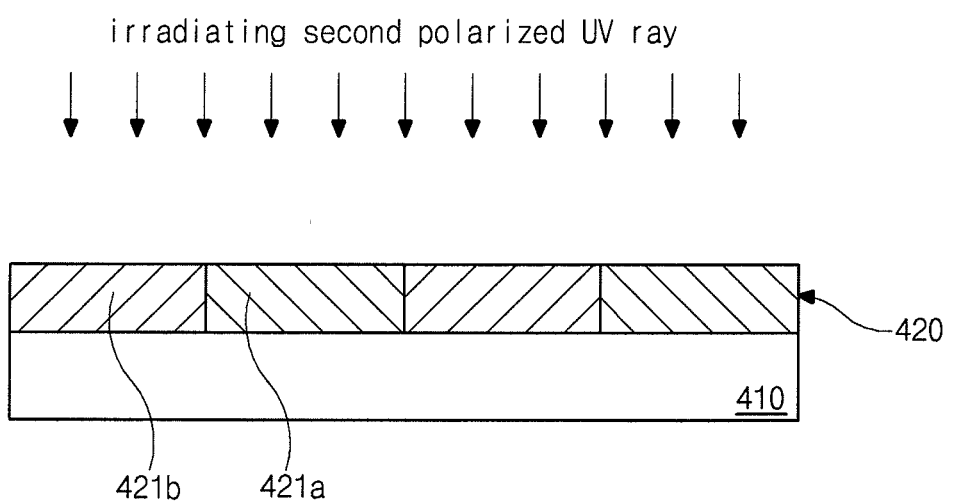

FIGS. 8A to 8C are cross-sectional views showing a method of fabricating a patterned retarder of a glasses type three-dimensional image display device according to a third embodiment of the present invention.

In FIG. 8A, a retarder material layer 420 is formed on a transparent substrate 410 by coating the substrate 410 with a solution of a retarder material. The retarder material layer 420 may have a thickness of about 0.5 µm to about 2.0 µm. For example, the substrate 410 may be one of a glass substrate, a film and a flexible substrate. The film may include one of tri acetate cellulose (TAC), cyclo olephine polymer (COP), poly carbonate (PC), polymethyl methacrylate (PMMA), polyethylene terephthalate (PET), polyethylene naphthalate (PEN), polyethersulfone (PES), polystyrene (PS) and polyimide (PI). In addition, the retarder material may include a photo-reactive liquid crystalline polymer, and the solution of the retarder material may be coated using one of a spin coating apparatus and a slit coating apparatus.

After the retarder material layer 420 is formed on the substrate 410, the substrate 410 is transferred to a drying apparatus such as an oven, a hot chamber and a hot plate and is heated in a temperature of about 24° C. to about 80° C. for about 60 sec to about 300 sec. As a result, the solvent in the retarder material layer 420 is partially eliminated and the retarder material layer 420 is dried. The step of drying the retarder material layer 420 may be referred to as a pre-baking process.

In FIG. 8B, a first photo mask 490 having a transmissive area TA and a blocking area BA is disposed over the retarder material layer 420. The transmissive area TA and the blocking area BA may have a stripe shape and may alternate with each other. Next, a first polarized UV ray is irradiated onto the retarder material layer 420 through the transmissive area TA of the first photo mask 490 to form a first oriented region 421a corresponding to the transmissive area TA. The first polarized UV ray may have an energy density of about 2 mJ/cm² to about 1000 mJ/cm² and may have a wavelength of about 200 nm to about 500 nm.

In FIG. 8C, a second polarized UV ray is irradiated onto the retarder material layer 420 without using a photo mask to form a second oriented region 421b corresponding to the blocking area BA of the first photo mask 490 (of FIG. 8B). As a result, the first oriented region 421a is formed by irradiation of the first and second UV rays, and the second oriented region 421b is formed by irradiation of the second UV ray. Each of the first and second oriented regions 421a and 421b has a retardation value (Δnd) of about 125 nm±10 nm with respect to a reference wavelength of about 550 nm.

The first and second polarized UV rays have the same wavelength as each other. In addition, an energy density of the second polarized UV ray may be smaller than an energy density of the first polarized UV ray. Preferably, an energy density of the second polarized UV ray may be smaller than a half of an energy density of the first polarized UV ray. For example, the second polarized UV ray may have an energy density of about 1 mJ/cm² to about 500 mJ/cm² and may have a wavelength of about 200 nm to about 500 nm. When the first polarized UV ray has an energy density of about 200 mJ/cm², the second polarized UV ray may have an energy density smaller than about 100 mJ/cm².

Further, the first and second polarized UV rays have different polarization axes from each other. For example, a polarization axis of the second polarized UV ray may be perpendicular to a polarization axis of the first polarized UV ray.

The substrate 410 having the retarder material layer 420 is transferred to a baking apparatus such as an oven, a hot chamber and a hot plate and is heated in a temperature of about 80° C. to about 130° C. for about 30 sec to about 600 sec. As a result, the solvent in the retarder material layer 420 is completely eliminated and the retarder material layer 420 is baked. The step of baking the retarder material layer 420 may be referred to as a post-baking process. The first and second oriented regions 421a and 421b of the retarder material layer 420 become first and second oriented patterns, respectively, by the post-baking process to complete a patterned retarder.

In the method of fabricating a patterned retarder of FIGS. 8A to 8C, the patterned retarder is fabricated without using an orientation film. Since a coating step and a dry step for the orientation film and a UV curing step for the liquid crystal layer are omitted, the fabrication process of the patterned retarder is simplified and the fabrication cost of the patterned retarder is reduced.

Figure 9:
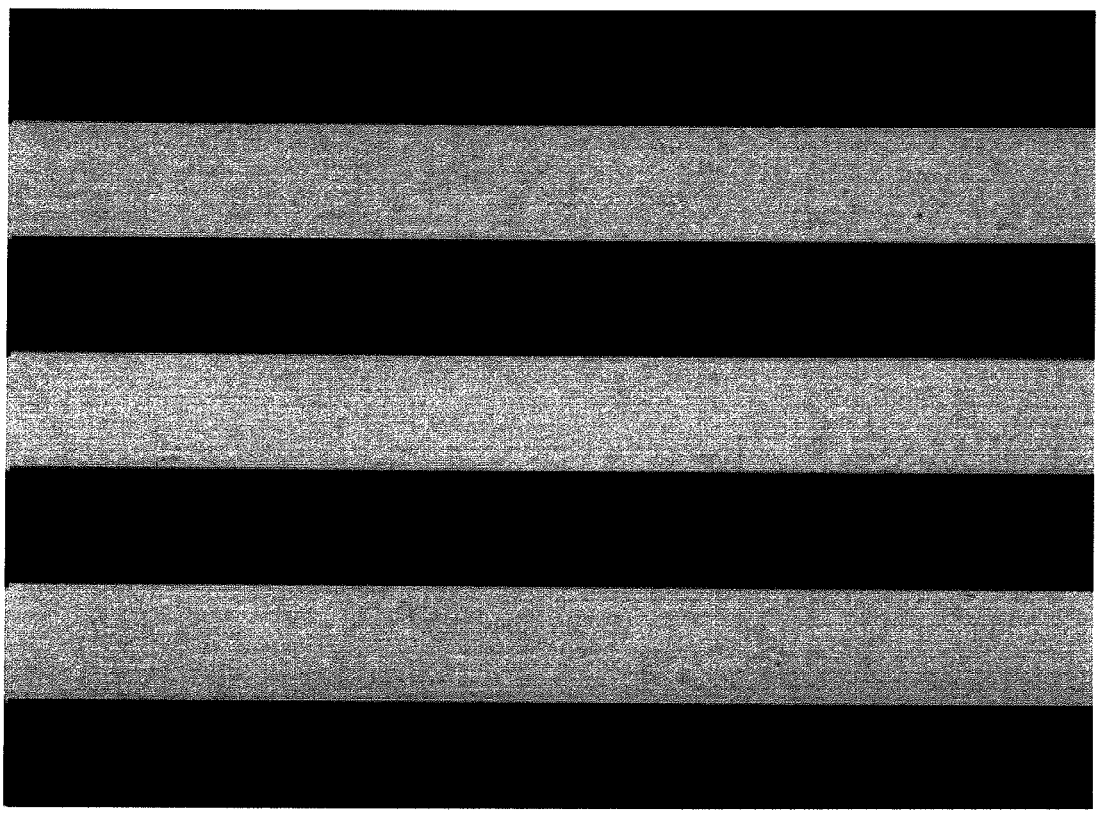
FIG. 9 is an image of an optical microscope showing a 32-inch patterned retarder of a glasses type three-dimensional image display device according to an embodiment of the present invention.

FIG. 9 is an image of an optical microscope showing a 32-inch patterned retarder of a glasses type three-dimensional image display device according to an embodiment of the present invention. The image of FIG. 9 is taken through a quarter wave plate (QWP) of a phase difference of λ/4 over the patterned retarder.

In FIG. 9, a first oriented pattern converting a linearly polarized light into a left circularly polarized light and a second oriented pattern converting a linearly polarized light into a right circularly polarized light alternate with each other, and each of the first and second oriented patterns has a width of about 365 µm±5 µm.

Consequently, in a method of fabricating a patterned retarder of a three-dimensional image display device, since the patterned retarder is fabricated without using an orientation film, a coating step and a dry step for the orientation film and a UV curing step for the liquid crystal layer are omitted. As a result, the fabrication process of the patterned retarder is simplified and the fabrication cost of the patterned retarder is reduced.

It will be apparent to those skilled in the art that various modifications and variations can be made in a method of fabricating a patterned retarder of the present disclosure without departing from the spirit or scope of the invention. Thus, it is intended that the present invention covers the modifications and variations of this invention provided they come within the scope of the appended claims and their equivalents.

What is claimed is:

1. A method of fabricating a patterned retarder, comprising:

forming a retarder material layer on a substrate by coating a retarder material;

irradiating a first polarized UV ray onto the retarder material layer, the first polarized UV ray having a first polarization axis;

irradiating a second polarized UV ray onto the retarder material layer, the second polarized UV ray having a second polarization axis perpendicular to the first polarization axis; and baking the retarder material layer to form first and second oriented patterns alternating with each other, each of the first and second oriented patterns having an anisotropic property, wherein the retarder material has a homopolymer type where a photo-reactive group is included in a side chain, and wherein the retarder material having the homopolymer type includes identical units, and a mesogenic property is obtained by a hydrogen bonding between the photo-reactive group of one of the identical units and the photo-reactive group of another of the identical units.

2. The method according to claim 1, wherein the first polarized UV ray is irradiated onto the retarder material layer through a first photo mask having first transmissive and blocking areas corresponding to the first and second oriented patterns, respectively, and wherein the second polarized UV ray is irradiated onto the retarder material layer through a second photo mask having second transmissive and blocking areas corresponding to the second and first oriented patterns, respectively.

3. The method according to claim 1, wherein each of the first and second polarized UV rays has an energy density within a range of about 1 mJ/cm$^2$ to about 500 mJ/cm$^2$ and has a wavelength within a range of about 200 nm to about 500 nm.

4. The method according claim 1, wherein the retarder material includes a photo-reactive mesogenic polymer having a cinnamate group.

5. A method of fabricating a patterned retarder, comprising:

forming a retarder material layer on a substrate by coating a retarder material;

irradiating a first polarized UV ray onto the whole retarder material layer, the first polarized UV ray having a first polarization axis and a first energy density;

irradiating a second polarized UV ray onto the retarder material layer, the second polarized UV ray having a second polarization axis perpendicular to the first polarization axis and a second energy density greater than the first energy density; and baking the retarder material layer to form first and second oriented patterns alternating with each other, each of the first and second oriented patterns having an anisotropic property, wherein the retarder material has a homopolymer type where a photo-reactive group is included in a side chain, and wherein the retarder material having the homopolymer type includes identical units, and a mesogenic property is obtained by a hydrogen bonding between the photo-reactive group of one of the identical units and the photo-reactive group of another of the identical units.

6. The method according to claim 5, wherein the second polarized UV ray is irradiated onto the retarder material layer through a first photo mask having blocking and transmissive areas corresponding to the first and second oriented patterns, respectively.

7. The method according to claim 5, wherein the first energy density is within a range of about 1 mJ/cm$^2$ to about 500 mJ/cm$^2$ and the second energy density is greater than a double of the first energy density, and wherein each of the first and second polarized UV rays has a wavelength within a range of about 200 nm to about 500 nm.

8. The method according to claim 5, wherein the retarder material includes a photo-reactive mesogenic polymer having a cinnamate group.

9. The method according to claim 5, wherein the retarder material has a refractive index anisotropy ($\Delta$n) within a range of about 0.10 to about 0.18.

10. The method according to claim 5, wherein the patterned retarder has a retardation value ($\Delta$nd) within a range of about 125 nm±10 nm with respect to a reference wavelength of about 550 nm.

11. The method according to claim 5, wherein a concentration of the retarder material to a retarder material solution may be within a range of about 1 wt % to about 30 wt %, wherein a solvent of the retarder material solution includes at least one of a ketone group, an ether group and a toluene group, and wherein the retarder material solution has a viscosity within a range of about 1 mPas to about 50 mPas.

12. The method according to claim 11, wherein the ketone group includes one of cyclohexanone, cyclopentanone, cyclopetanone and methyl isobutyl ketone (MIBK), and the ether group includes propylene glycol monomethyl ether (PGME).

13. The method according to claim 11, wherein the solvent further has a leveling agent including one of a silicon group and an acryl group.

14. The method according to claim 5, further comprising drying the retarder material layer in a drying apparatus at a temperature within a range of about 24° C. to about 80° C. for about 60 sec to about 300 sec.

15. The method according to claim 5, wherein the retarder material layer is baked at a temperature within a range of about 80° C. to about 130° C. for about 30 sec to about 600 sec.

16. A method of fabricating a patterned retarder, comprising:

forming a retarder material layer on a substrate by coating a retarder material;

irradiating a first polarized UV ray onto the retarder material layer, the first polarized UV ray having a first polarization axis and a first energy density;

irradiating a second polarized UV ray onto the whole retarder material layer, the second polarized UV ray having a second polarization axis perpendicular to the first polarization axis and a second energy density smaller than the first energy density; and baking the retarder material layer to form first and second oriented patterns alternating with each other, each of the first and second oriented patterns having an anisotropic property, wherein the retarder material has a homopolymer type where a photo-reactive group is included in a side chain, and wherein the retarder material having the homopolymer type includes identical units, and a mesogenic property is obtained by a hydrogen bonding between the photo-reactive group of one of the identical units and the photo-reactive group of another of the identical units.

17. The method according to claim 16, wherein the first polarized UV ray is irradiated onto the retarder material layer through a first photo mask having transmissive and blocking areas corresponding to the first and second oriented patterns, respectively.

18. The method according to claim 16, wherein the first energy density is within a range of about 2 mJ/cm$^2$ to about 1000 mJ/cm$^2$ and the second energy density is smaller than a half of the first energy density, and wherein each of the first and second polarized UV rays has a wavelength within a range of about 200 nm to about 500 nm.

19. The method according to claim 16, wherein the retarder material includes a photo-reactive mesogenic polymer having a cinnamate group.

* * * * *